United States Patent [19]

Yoshida et al.

[11] Patent Number: 4,580,963
[45] Date of Patent: Apr. 8, 1986

[54] METHOD OF AND APPARATUS FOR CHOPPING RUNNERS AND SPRUES

[75] Inventors: Hiroshi Yoshida, Kurobe; Tsutomu Hamatani, Namerikawa, both of Japan

[73] Assignee: Yoshida Kogyo K. K., Tokyo, Japan

[21] Appl. No.: 648,177

[22] Filed: Sep. 7, 1984

[30] Foreign Application Priority Data

Sep. 9, 1983 [JP] Japan ................. 58-166349
Mar. 3, 1984 [JP] Japan ................. 59-41011
May 4, 1984 [JP] Japan ................. 59-88429

[51] Int. Cl.$^4$ .................. B29B 11/08; B29C 45/38
[52] U.S. Cl. .................. 425/121; 425/122; 425/217; 425/307; 425/308; 425/315; 425/814; 425/DIG. 34; 425/DIG. 46; 425/DIG. 51; 241/3; 241/101.4; 83/39; 83/923
[58] Field of Search ............ 83/39; 241/3, 101.4, 241/101 R, 101.2; 425/121, 122, 216, 217, 306, 307, 308, 315, 814, DIG. 34, DIG. 51, DIG. 46

[56] References Cited

U.S. PATENT DOCUMENTS

| | | | |
|---|---|---|---|
| 4,222,723 | 9/1980 | Sawada | 425/814 |
| 4,226,577 | 10/1980 | Sawada | 425/814 |
| 4,321,027 | 3/1982 | Stoehr et al. | 425/216 |
| 4,492,547 | 1/1985 | Nogai | 425/814 |
| 4,505,659 | 3/1985 | Chijiishi et al. | 425/814 |

FOREIGN PATENT DOCUMENTS 3820921 12/1963 Japan .
399385 6/1964 Japan .

Primary Examiner—Donald R. Schran
Attorney, Agent, or Firm—Hill, Van Santen, Steadman & Simpson

[57] ABSTRACT

A runner structure composed of a runner and a sprue is discharged from an injection molding machine into a chopping apparatus having a first cutter mechanism and a second cutter mechanism. The runner structure is guided by a guide mechanism in the chopping apparatus toward the first and second cutter mechanisms. The sprue is cut off from the runner by the first cutter mechanism, and then the runner and the sprue are chopped by the second cutter mechanism. The first cutter mechanism has a lower cutter for stopping the runner structure by engagement with the sprue, and an upper cutter movable into coaction with the lower cutter for cutting off the sprue. The second cutter mechanism includes a feed roller for feeding the runner intermittently and a cutter reciprocably movable for chopping the runner on the feed roller. The chopped pieces are discharged through a hopper and delivered into the injection molding machine for recycling.

19 Claims, 28 Drawing Figures

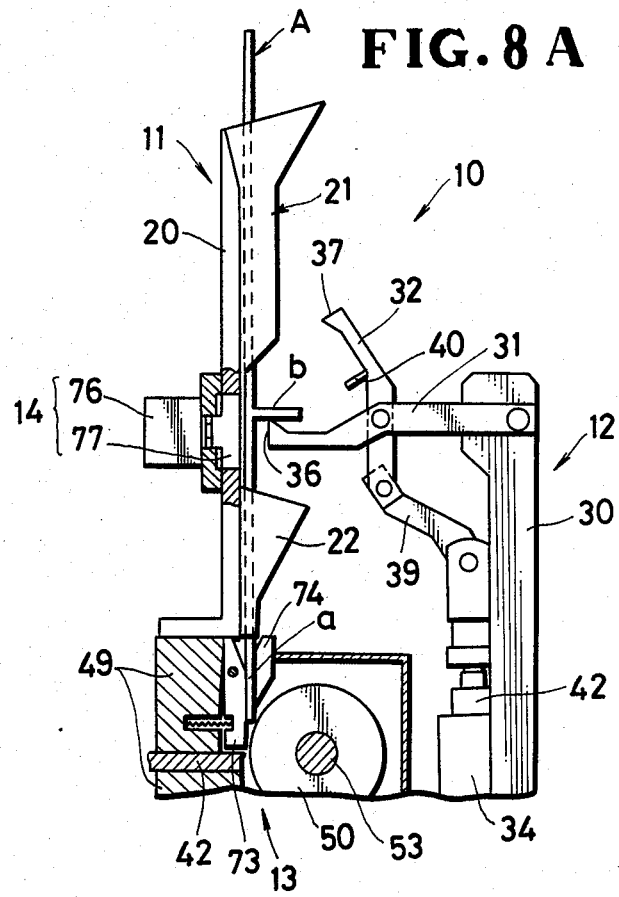

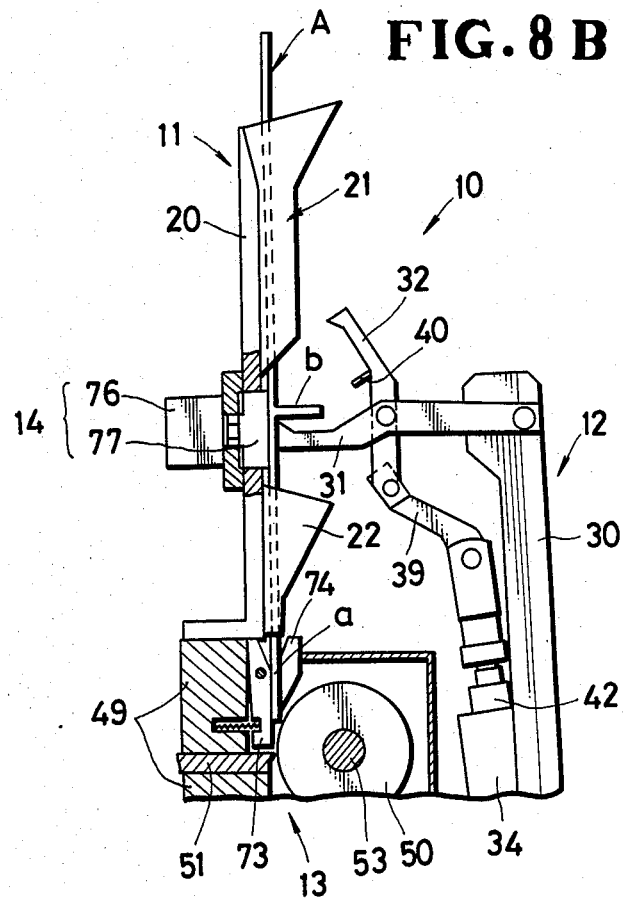

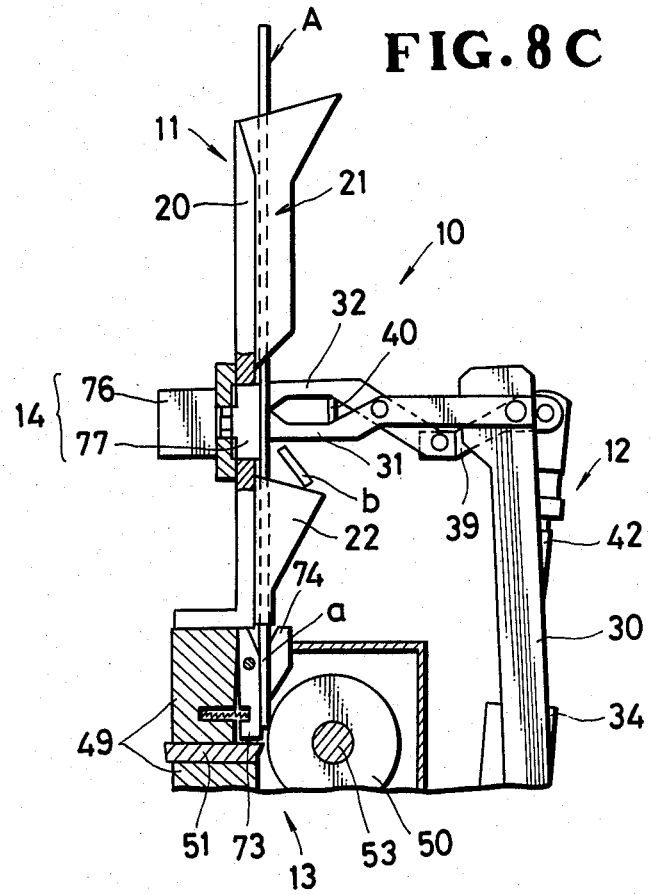

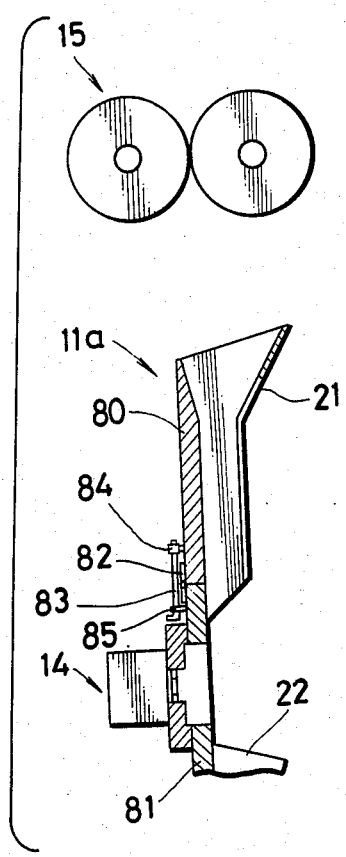
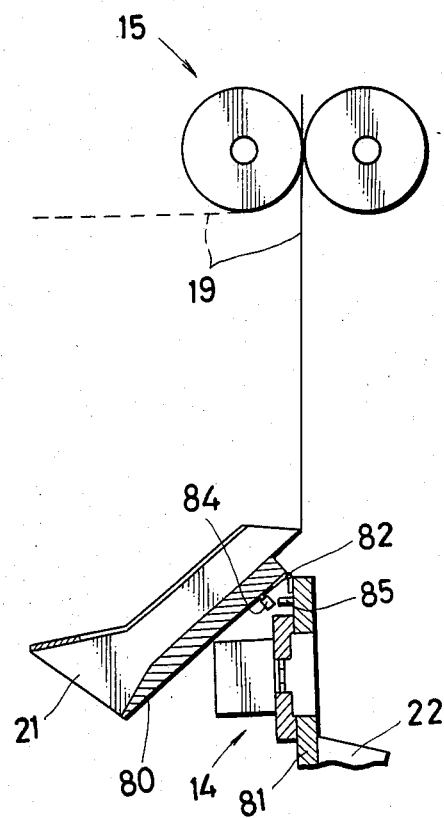
FIG. 11 A
FIG. 11 B

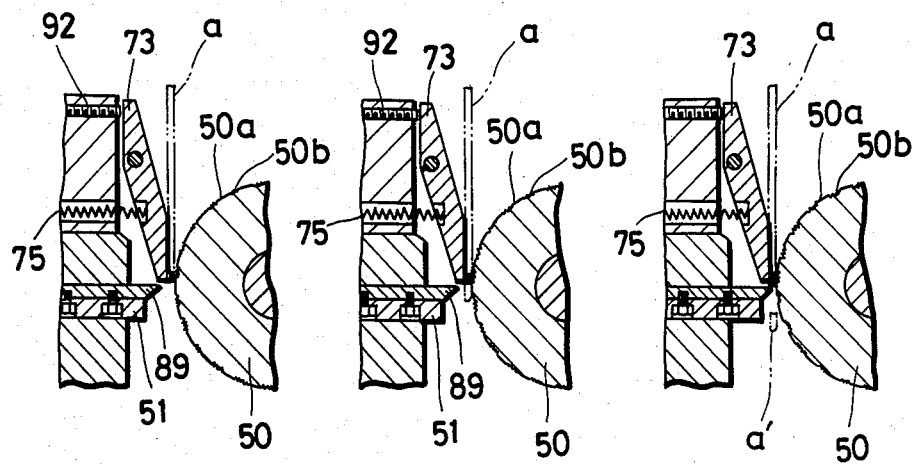
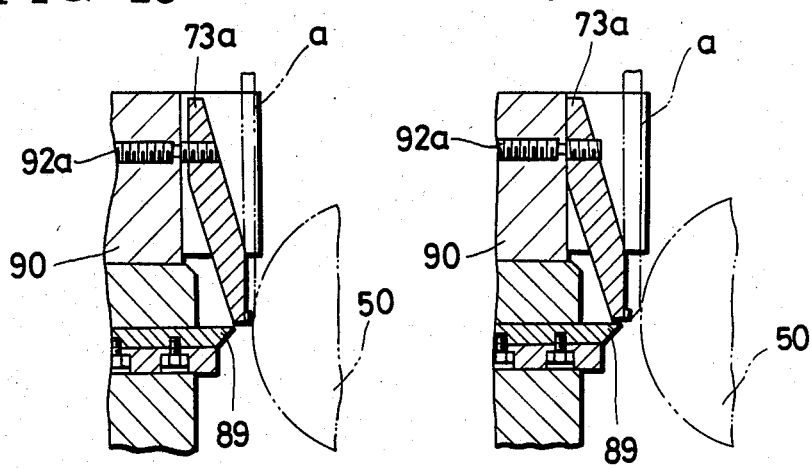

4,580,963

METHOD OF AND APPARATUS FOR CHOPPING RUNNERS AND SPRUES

BACKGROUND OF THE INVENTION

1. Field of the Invention

The present invention relates to a method of and an apparatus for chopping into pieces runners and sprues discharged from an injection molding machine in an apparatus for manufacturing slide fastener chains having molded coupling elements of synthetic resin.

2. Description of the Prior Art

There are known apparatus for manufacturing slide fastener chains by injection-molding a plurality of coupling elements of synthetic resin simultaneously on a pair of slide fastener stringer tapes. Since the injection-molded coupling elements are interconnected by a runner which is formed in a feed channel or runner in a mold, the molded runner is required to be cut off as disclosed in Japanese Patent Publications 39-9385 and 38-20921. The molded runners discharged from the injection molding machine in the apparatus are collected for reuse. More specifically, the runner is cut off by a cutter into pieces 5 to 6 cm long, which are then chopped as by a crusher into smaller chips having a length of about 3-5 mm that will be fed again into the injection molding machine. However, the prior chopping process requires two devices, the cutter and the crusher, and an expenditure of manual labor for carrying the broken pieces from the cutter to the crusher and operating the crusher. The crusher scatters the chopped pieces resulting in a loss of reusable material and contaminates surroundings with the scattered chips. When a differently colored runner is to be processed, the cutter and the crusher have to be cleaned.

SUMMARY OF THE INVENTION

It is an object of the present invention to provide a method of automatically chopping runners and sprues discharged from an injection molding machine into pieces for reuse.

Another object of the present invention is to provide an apparatus of a simple construction for automatically chopping runners and sprues discharged from an injection molding machine into pieces for reuse.

Still another object of the present invention is to provide a method of and an apparatus for chopping runners and sprues without producing any loss of plastic material, without scattering chopped pieces, and without having to clean the chopper each time a differently colored runner is to be chopped.

According to the present invention, a runner structure composed of a runner and a sprue which is discharged from an injection molding machine is fed into a chopping apparatus having a first cutter mechanism and a second cutter mechanism. The runner structure is guided by a guide mechanism in the chopping apparatus toward the first and second cutter mechanisms. The sprue is cut off from the runner by the first cutter mechanism, and then the runner and the sprue are chopped by the second cutter mechanism into pieces for reuse.

The first cutter mechanism has a lower cutter for stopping the runner structure by engagement with the sprue, and an upper cutter movable into coaction with the lower cutter for cutting off the sprue. The second cutter mechanism includes a feed roller for feeding the runner intermittently and a cutter reciprocally movable for chopping the runner on the feed roller. The chopped pieces are discharged through a hopper and delivered into the injection molding machine for recycling.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIGS. 8A through 8C are fragmentary front elevational views showing progressive steps of operation of the chopping apparatus;

FIGS. 11A and 11B are cross-sectional views of a guide mechanism according to still another embodiment;

FIGS. 14A through 14C are fragmentary cross-sectional views of the manner in which a runner is progressively chopped by the chopping apparatus of FIG. 12;

FIGS. 15A and 15B are fragmentary cross-sectional views illustrative of a chopping apparatus according to a modification;

DESCRIPTION OF THE PREFERRED EMBODIMENTS

Figure 1:
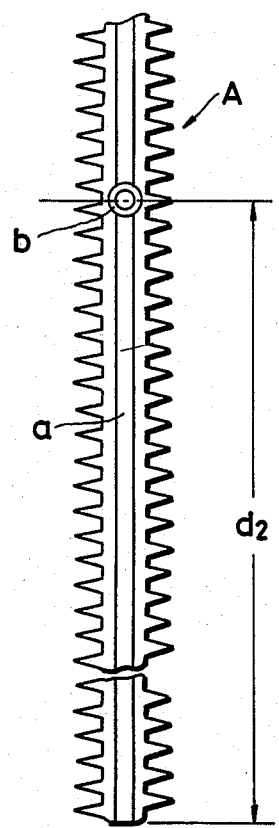
FIG. 1 is a front elevational view of a runner to be chopped.

Like or similar reference characters denote same or corresponding parts throughout the views.

Figure 2:
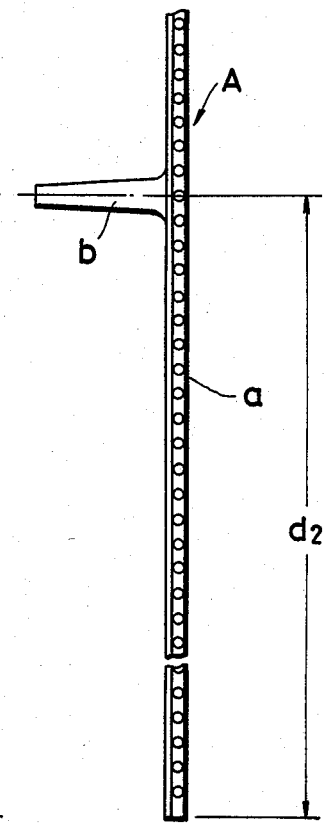
FIG. 2 is a side elevational view of the runner of FIG. 1.

FIGS. 1 and 2 illustrate a runner structure A cut off a slide fastener stringer chain on which coupling elements are injection-molded of synthetic resin. Since the injection molding machine for molding the coupling elements has a main feed channel or runner also called a sprue and a feed channel connecting the sprue to mold cavity gates, the runner structure A also has a molded runner a and a sprue b projecting substantially perpendicularly from the runner a.

As shown in FIGS. 3 through 7, a runner chopping apparatus 10 for chopping the runner structure A generally includes a guide mechanism 11 for guiding the runner structure A downwardly, a first cutter mechanism 12 for cutting off the sprue b from the runner a, a second cutter mechanism 13 for cutting the runner a as guided by the guide mechanism 11 into smaller pieces, and a pusher mechanism 14 actuatable when the sprue b is severed. The runner chopping apparatus 10 is disposed below a roller pair 15 for separating the runner structure A from a slide fastener stringer chain 18 as dischraged from a pair of molds 17 in an injection molding machine.

Figure 4:
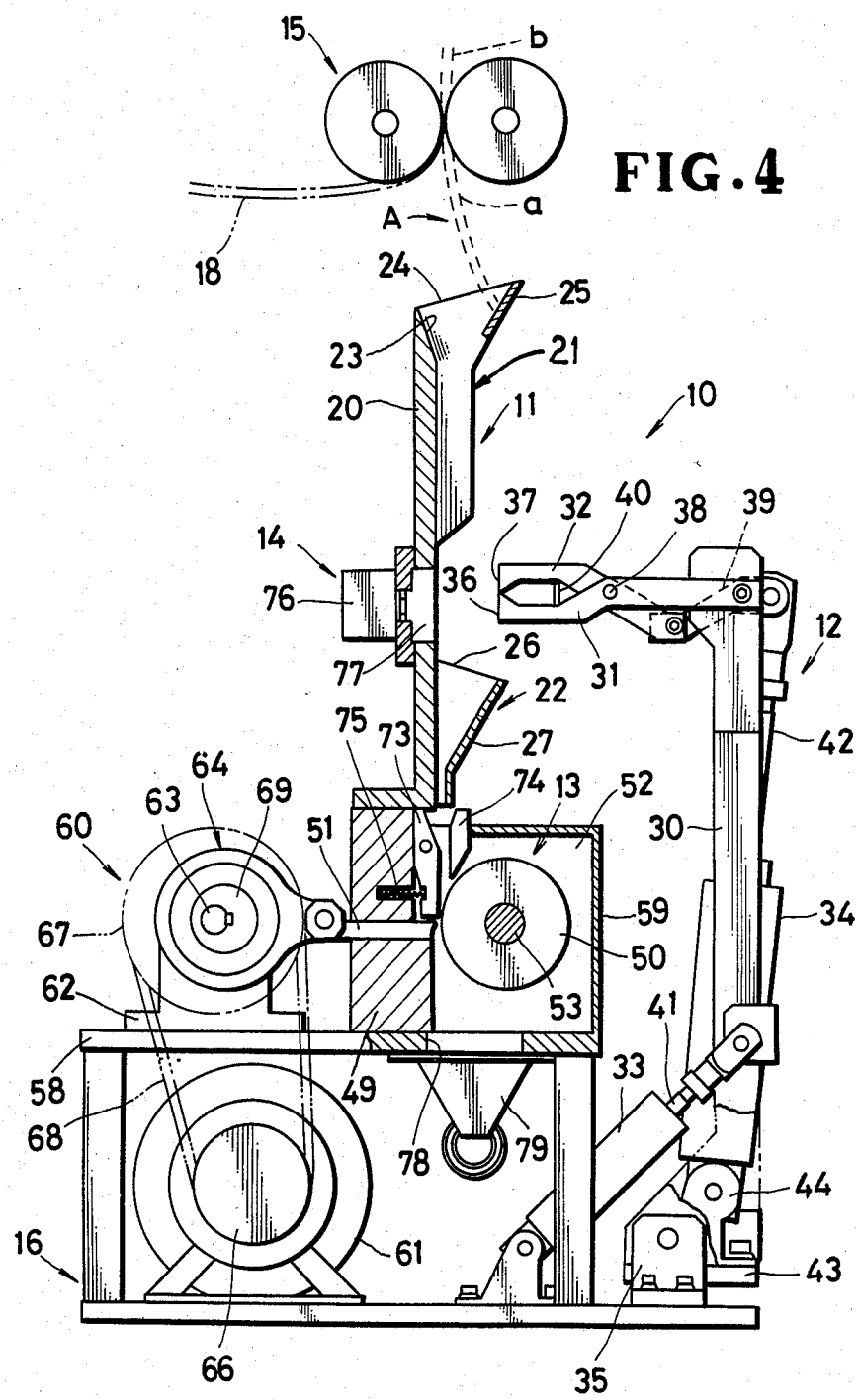
FIG. 4 is an enlarged front elevational view, partly in cross section, of the chopping apparatus.

In FIG. 4, the guide mechanism 11 serves to allow the runner structure A from the roller pair 15 to go downwardly by gravity, and has a guide base plate 20, a guide cover 21, and a sprue receiver 22.

The guide base plate 20 comprises a flat plate wider than the runner structure A and having an upper slant surface 23. The guide base plate 20 has a lower horizontal flange fastened by screws to a pair of support walls 52 mounted on a support base 16.

The guide cover 21 is mounted on an upper portion of the guide base plate 20 closely to the slanted surface 23. The guide cover 21 is composed of a pair of longitudinal parallel side walls 24 and a front wall 25 interconnecting the side walls 24 at their upper front edges. The side walls 24 are progressively wider toward their upper ends and spaced from each other by a distance slightly greater than the width of the runner structure A. The front wall 25 is inclined downwardly toward the guide base plate 20, such that the front wall 25, the side walls 24, and the slanted surafce 23 jointly constitute a hopper-shaped runner receiver. The guide cover 21 and the guide base plate 20 are jointly of a channel-shaped cross section opening laterally below the front wall 25 for passage of the sprue b of the runner structure A as it is guided down the guide cover 21. The lower edge of the front wall 25 is spaced from the guide base plate 20 by a distance greater than the length of the sprue b, so that the runner A will go downwardly with the sprue b clearing the front wall 25.

The sprue receiver 22 is mounted on the guide base plate 20 on the side thereof on which the guide cover 21 is mounted. The sprue receiver 22 is composed of a pair of longitudinal parallel side walls 26 and a front wall 27 interconnecting the side walls 26 along their entire front edges. The side walls 26, the front wall 27, and the guide base plate 20 jointly serve as a hopper.

The first cutter mechanism 12 comprises a swingable arm 30, a lower cutter 31 mounted on an upper end of the swingable arm 30, an upper cutter 32 pivotally coupled to the lower cutter 31, an air cylinder 33 for swinging the arm 30, and an air cylinder 34 for moving the upper cutter 32 toward and away from the lower cutter 31.

The arm 30 is pivotally mounted on a pair of support members 35 fastened by screws to the support base 16. The arm 30 is angularly moved by the air cylinder 33 to move a pair of cutter edges 36, 37 of the cutters 31, 32 toward and away from a position vertically between the guide cover 21 and the sprue receiver 22.

The lower cutter 31 extends normally to the guide base plate 20, and the upper cutter 32 is mounted on the lower cutter 31 by a pivot 38 so as to be angularly movable through an arcuate path with respect to the lower cutter 31. A link 39 is pivotally connected at one end to an end of the upper cutter 32 remote from the cutter edge 37, and has an opposite end pivotally coupled to a piston rod 42 of the air cylinder 34. The upper cutter 32 has a stopper 40 which prevents the upper cutter 32 from turning beyond the lower cutter 31 when the cutter edges 37, 36 engage each other. The stopper 40 also serves to prevent a cut-off sprue b from being scattered toward the arm 30, but allows the cut-off sprue b to drop into the sprue receiver 22.

Figure 5:
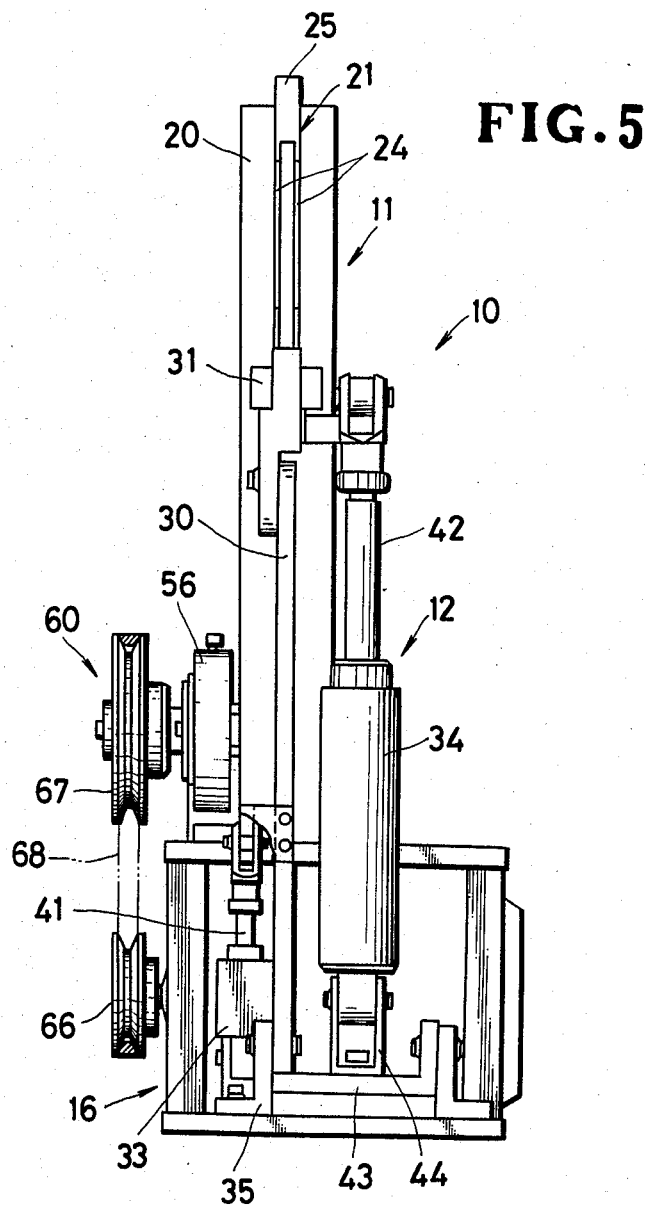
FIG. 5 is a side elevational view of the chopping apparatus.

As illustrated in FIGS. 4 and 5, the air cylinder 33 has a piston rod 41 pivotally connected to the arm 30 and a cylinder pivotally connected to the support base 16. The air cylinder 34 has its cylinder pivotally mounted on a second support member 44 mounted on a support member 43 pivotally supported on the support members 35 mounted on the support base 16. The air cylinder 34 is thus angularly movable with the arm 30.

The second cutter mechanism 13 is disposed below the guide mechanism 11 and has a feed roller 50 for intermittently feeding the runner a as guided by the guide mechanism 11 and a cutter 51 movable toward and away from the feed roller 50 to cut off the runner a.

Figure 6:
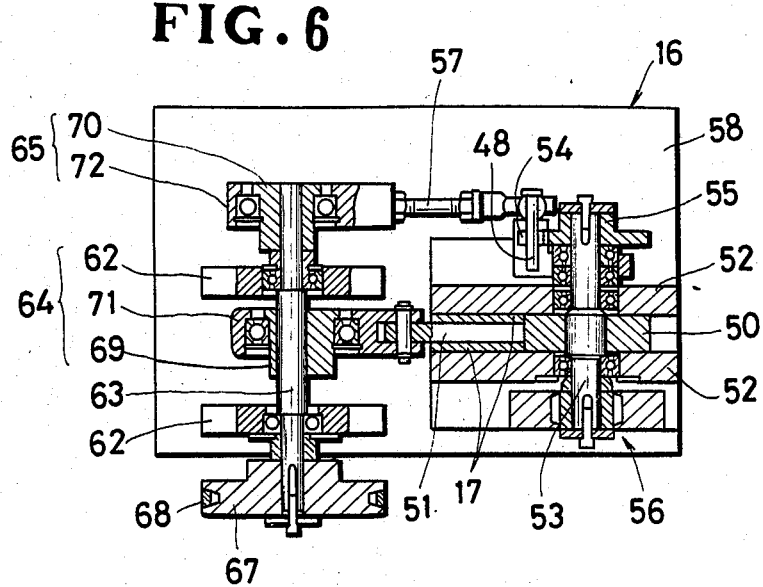
FIG. 6 is a plan view, partly in cross section, of the chopping apparatus.
Figure 7:
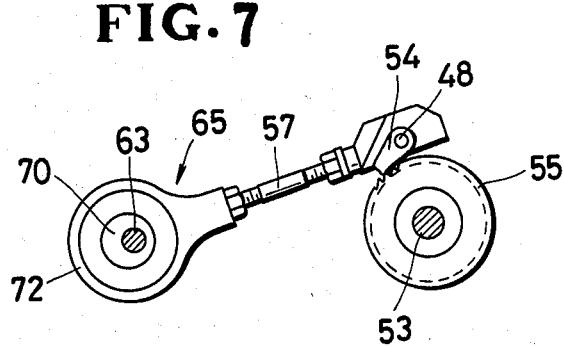
FIG. 7 is a front elevational view of a mechanism for intermittently rotating a feed roller.

As shown in FIG. 6, the feed roller 50 is fixed to a rotatable shaft 53 rotatably suported by and between the pair of support walls 52 secured to the support base 16. The rotatable shaft 53 has opposite ends projecting beyond the support walls 52. A ratchet wheel 55 is mounted on one of the projecting ends of the rotatable shaft 53. A pawl 54 engages the ratchet wheel 55. The pawl 54 and the ratchet wheel 55 jointly constitute a ratchet mechanism. A brake mechanism 56 is mounted on the other end of the rotatable shaft 53 for preventing the feed roller 50 from overrunning or reversing. The pawl 54 is pivotally mounted on a support shaft 48 mounted on a rod 57 movable back and forth by a drive mechanism 60 (FIG. 4).

Figure 3:
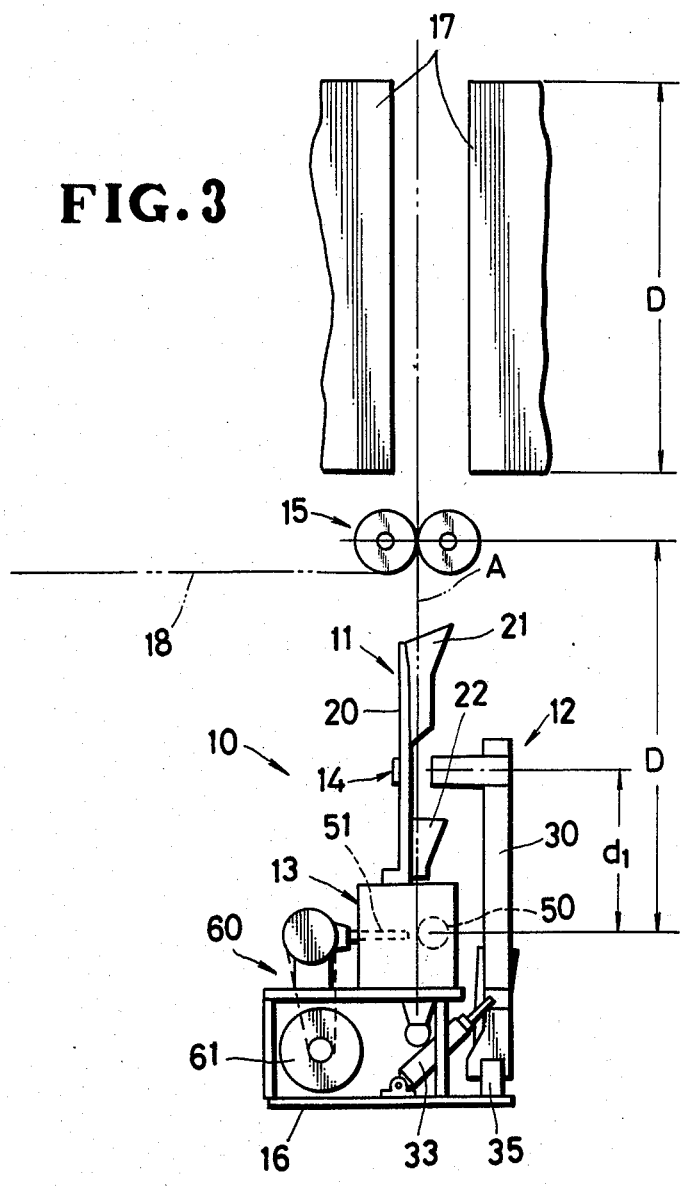
FIG. 3 is a schematic front elevational view of an apparatus for chopping runners.

The cutter 51 is in the form of a flat plate having a pointed sharp end or edge directed toward the feed roller 50 and is supported reciprocably by a cutter support body 49. As shown in FIG. 3, the cutter 51 is spaced downwardly from the cutter edge 36 of the lower cutter 31 of the first cutter mechanism 12 by a distance $d_1$ which is slightly greater than a distance $d_2$ (FIGS. 1 and 2) between the leading end of the runner a and the sprue b.

The feed roller 50 and the cutter 51 (FIG. 4) are surrounded by the cutter support body 49, an upper plate 58 of the support base 16, the support walls 52, and a front cover 59 of an inverted L-shaped configuration.

As shown in FIGS. 4, 5, and 6, the drive mechanism 60 comprises a motor 61 mounted in the support base 16, a shaft 63 rotatably supported on a pair of supports 62 mounted on the support base 16, and a motion converting mechanism 64, 65 for converting rotary motion of the shaft 63 into reciprocatory motion. Rotative power from the motor 61 is transmitted to the shaft 63 through an endless belt 68 trained around a pulley 66 mounted on a motor shaft of the motor 61 and a pulley 67 mounted on the shaft 63.

In FIG. 6, the motion converting mechanism 64, 65 is composed of circular rotary bodies 69, 70 eccentrically mounted on the shaft 63, and drivers 71, 72 rotatably mounted by bearings on the rotary bodies 69, 70, respectively. The driver 71 is pivotally connected to the cutter 51, while the driver 72 is coupled to the rod 57. The feed roller 50 is turned about the shaft 53 by the pawl 54 and the ratchet wheel 55 by one angular pitch equal to an interval between adjacent teeth on the ratchet wheel 55 each time the cutter 51 makes one reciprocating movement.

The rotary bodies 69, 70 are eccentrically mounted on the shaft 63 180° out of phase with each other so that the drivers 71, 72 move back and forth alternately. Therefore, the feed roller 50 is stopped against rotation when the cutter 51 is advanced toward the feed roller 50, and is angularly moved one pitch when the cutter 51 is retracted away from the feed roller 50.

As illustrated in FIG. 4, between the guide mechanism 11 and the second cutter mechanism 13, there are provided a presser 73 for pressing the runner a against the feed roller 50 and a guide 74 for guiding the runner a between the presser 73 and the feed roller 50. The presser 73 is pivotally mounted on and disposed between the support walls 52 in confronting relation to the feed roller 50. The presser 73 is normally urged to move toward the feed roller 50 under the force of a spring 75 acting between the presser 73 and the cutter support body 49. The runner a as it is delivered toward the feed roller 50 after the sprue b has been severed therefrom (in a manner described below) is intermittently fed along in synchronism with incremental rotation of the feed roller 50.

The pusher mechanism 14 serves to displace the runner structure A toward the cutter edges 36, 37 of the cutters 31, 32 when the sprue b is to be cut off from the runner structure A by the first cutter mechanism 12. The pusher mechanism 14 includes a plunger 76 mounted on a back of the guide base plate 20 and a pusher 77 movable by the plunger 76 toward and away from the cutters 31, 32, the pusher 77 having a flat front surface. When the plunger 76 remains inactivated, the flat front surface of the pusher 77 lies flush with the front surface of the guide base plate 20. When the plunger 76 is actuated, the pusher 77 is displaced toward the cutters 31, 32.

The upper plate 58 of the support base 16 has a hole 78 defined therein for passage therethrough of pieces or chips cut off the runner a by the second cutter mechanism 13. A hopper 79 is mounted in the support base 16 below the hole 78 for collecting the chips falling through the hole 78 and for delivering them into a box (not shown) or onto a conveyor belt (not shown), from which the chips will be transferred into a hopper of the injection molding machine or pneumatically fed through a transfer pipe into the hopper of the injection molding machine.

The roller pair 15 for separating the runner structure A from the slide fastener chain 18 is known from Japanese Patent Publications 38-20921 and 39-9385, referred to above, and is not described in detail.

As shown in FIG. 3, the distance D between the cutter 51 and the center of the roller pair 15 should be selected to be equal to the length of a series of cavity gates (not shown) in each of the molds 17 or the length of the runner structure A. With this arrangement, a prior runner structure and a next successive runner will be longitudinally spaced a distance equal to the distance between the center of the roller pair 15 and the lower end of the molds 17 after the prior runner structure has fully entered the chopping apparatus 10. Accordingly, no two unchopped runner structures will be simultaneously introduced into the chopping apparatus 10.

Operation of the chopping apparatus 10 is described with reference to FIGS. 4 and 8A to 8C.

Before starting a cycle of chopping a runner structure A, the piston rod 41 in the first cutter mechanism 12 is projected and the piston rod 42 is retracted to displace the upper cutter 32 away from the lower cutter 31 and also from a path of movement of the sprue b of the runner structure A as it is guided by the guide mechanism 11. The lower cutter 31 is spaced from the guide base plate 20, but projects into the path of movement of the sprue b to prevent the sprue b from moving downwardly. In the second cutter mechanism 13, the motor 61 rotates at all times to move the cutter 51 back and forth and at the same time to rotate the feed roller 50 intermittently.

When the runner structure A is discharged from the roller pair 15, it is guided to move downwardly by the guide mechanism 11. Where the runner structure A is not hardened completely when it is separated by the roller pair 15, the runner a tends to be curved as shown in FIG. 4. However, the front wall 25 engages and guides the leading end of the curved runner a toward the guide base plate 20. Accordingly, the runner structure A is fed down the guide mechanism 11 while it is being progressively shaped to proper contour and hardened. Where the trailing end portion of the runner a is not hardened enough and is curved by the roller pair 15, it is properly shaped to contour while the sprue b is guided by the front wall 25 toward the guide base plate 20 and the leading end of the runner a is guided by the front wall 27 of the sprue receiver 22 toward the guide base plate 20.

When the sprue b is engaged by the cutter edge 36 of the lower cutter 31 as shown in FIG. 8A, the runner structure A is temporarily stopped in the illustrated position. At this time, leading end of the runner a is positioned just short of engagement with the feed roller 50 since the distance $d_2$ from the sprue b to the leading end of the runner a is slightly smaller than the distance $d_1$ between the lower cutter 31 and the cutter 51.

Upon engagement between the sprue b and the lower cutter 31, the plunger 76 is energized to displace the pusher 77 laterally from the guide base plate 20 and the piston rod 41 is retracted to tilt the arm 30 for thereby moving the cutters 31, 32 toward the guide base plate 20. The runner structure A is now sandwiched between the pusher 77 and the lower cutter 31 as illustrated in FIG. 8B.

As the piston rod 41 is retracted, the piston rod 42 is projected to turn the upper cutter 32 counterclockwise as shown in FIG. 8C to cut off the sprue b between the cutter edges 36, 37. Since the runner a is pushed slightly downwardly by the upper cutter 32, the leading end of the runner a is forced downwardly between the feed roller 50 and the presser 73. The runner a starts being intermittently fed by the feed roller 50 and chopped by the reciprocating cutter 51 into small pieces or chips which drop through the hole 78 into the hopper 79.

The severed sprue b falls into the sprue receiver 22 and remains therein as long as the runner a is present in the sprue receiver 22. As the runner a is progressively chopped until finally it is fed out of the sprue receiver 22, the sprue b follows the trailing end of the runner a and moves from the sprue receiver 22 into the second cutter mechanism 13, wherein the sprue b is intermittently fed by the feed roller 50 and chopped into pieces, about 3 mm long, by the cutter 51.

After the sprue b has been cut off from the runner a, the piston rod 42 is retracted and the piston rod 41 is projected to bring the cutters 31, 32 to the position of FIG. 8A. The plunger 76 is de-energized to retract the pusher 77 back into the guide base plate 20.

Accordingly, the sprue b can be severed from the runner a by the first cutter mechanism 12, and then the runner a and the sprue b can be chopped automatically by the second cutter mechanism 13, so that both the runner a and the sprue b can be recycled. The chopping apparatus is of a relatively simple construction since the runner a and the sprue b can be chopped into pieces by the second cutter mechanism 13 only. The chopping apparatus is also advantageous in that the first cutter mechanism 12 serves both to stop the runner structure A and to cut off the sprue b from the runner a, and also because the second cutter mechanism 13 serves both to feed the runner a and to chop the runner a and the sprue b. The chopping apparatus operates automatically so that manual labor is substantially eliminated. The second cutter mechanism 13 prevents chips from being scattered and hence does not produce a loss of material that can be reused. The feed roller 50 doubles as a member to bear thereon the runner a as it is chopped, and chips will come off the feed roller 50 when the feed roller 50 is intermittently rotated. Accordingly, it is not necessary to clean the feed roller 50 when differently colored runners are to be chopped.

Figure 9:
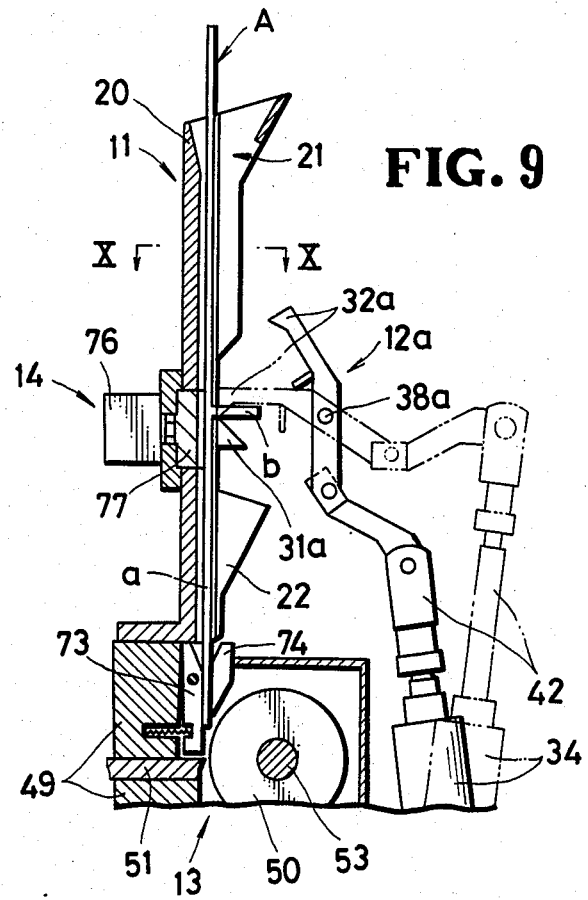
FIG. 9 is a fragmentary front elevational view, partly in cross section, of a chopping apparatus according to another embodiment.
Figure 10:
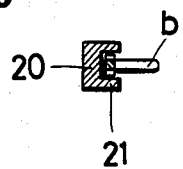
FIG. 10 is a cross-sectional view taken along line X—X of FIG. 9.

FIGS. 9 and 10 show a first cutter mechanism 12a according to another embodiment of the present invention. The first cutter mechanism 12a includes a lower cutter 31a fixed to a frame (not shown) in the path of movement of a sprue b and close to the path of movement of a runner a, and an upper cutter 32a pivotally mounted by a shaft 38a fixed to the frame.

In operation, the sprue b of the runner structure A guided by the guide mechanism 11 is temporarily stopped by engagement with the lower cutter 31a. When the plunger 76 of the pusher mechanism 14 is energized, the sprue b is sandwiched between the pusher 77 and the lower cutter 31a. Thereafter, the piston rod 42 is projected to turn the upper cutter 32a counterclockwise to the position indicated by the two-dot-and-dash line in FIG. 9 to cut off the sprue b from the runner a in coaction with the lower cutter 31a. The upper cutter 32a then returns to the solid-line position, and the runner a and the sprue b are chopped to pieces by the second cutter mechanism 13.

FIGS. 11A and 11B are illustrative of a guide mechanism 11a according to another embodiment of the invention. The guide mechanism 11a includes a guide base plate composed of an upper plate 80 and a lower plate 81 interconnected by a hinge 82 on rear surfaces thereof, the guide cover 21 being mounted on the upper plate 80. The upper and lower plates 80, 81 have staples or locking guides 84, 85, respectively, adjacent to the hinge 82. When the chopping apparatus is in operation or readied for operation, the upper plate 80 is locked in an upright position by a pin 83 extending through and retained in the staples 84, 85, as shown in FIG. 11A. When slide fastener tapes 19 are to be set in the injection molding machine, the pin 83 is removed and the upper plate 80 is turned down as shown in FIG. 11B. The slide fastener tapes 19 are now set in the injection molding machine as the tapes 19 depend downwardly from the roller pair 15, and then are directed horizontally in its direction of feed. The upper plate 80 therefore does not interfere with the slide fastener tapes 19 as they are set in the injection molding machine.

Figure 12:
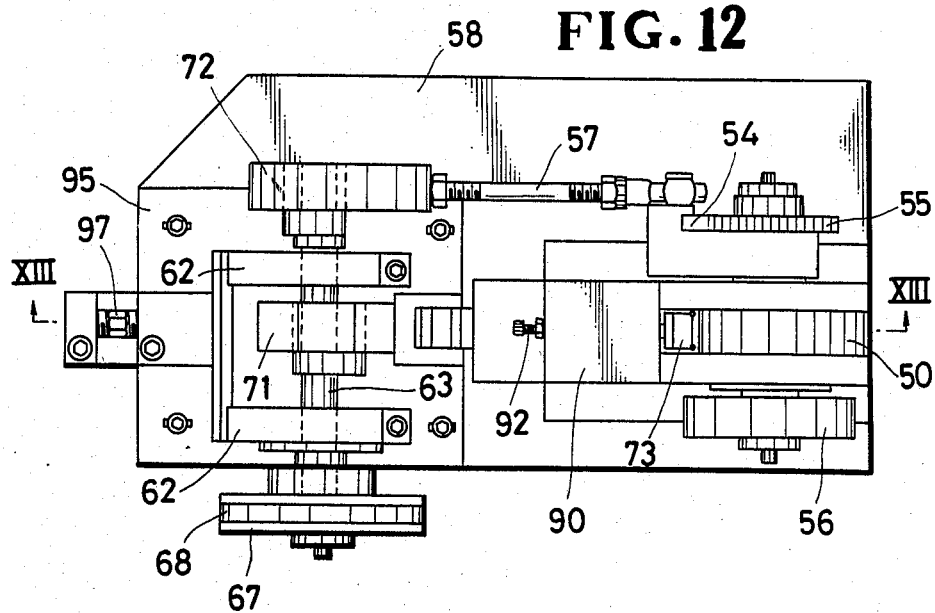
FIG. 12 is a plan view of the chopping apparatus shown in FIG. 4.
Figure 13:
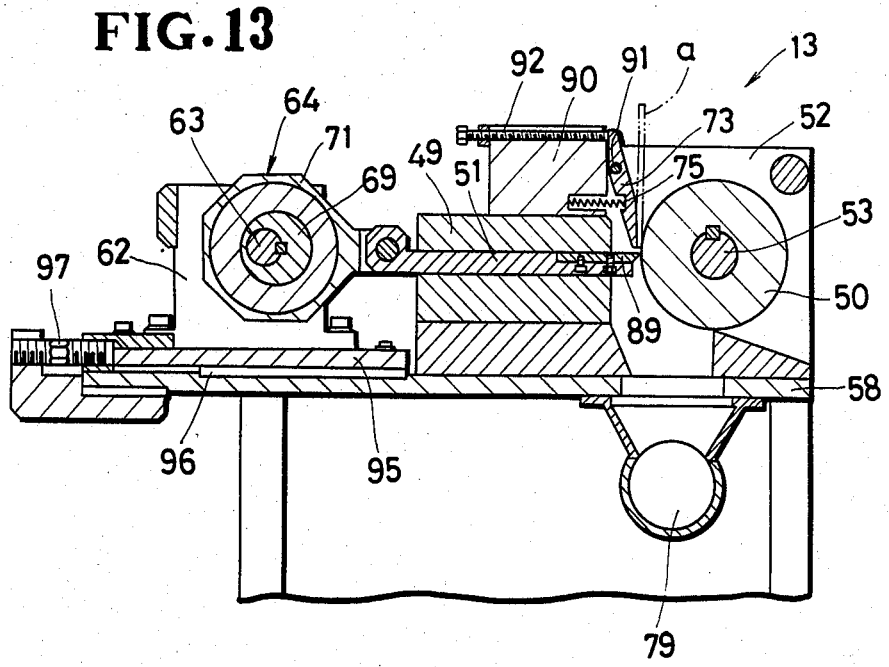
FIG. 13 is a cross-sectional view taken along line XIII—XIII of FIG. 12.

The second cutter mechanism 13 has been shown only schematically in FIGS. 4 and 6, for example. FIGS. 12 and 13 show the second cutter mechanism 13 in greater detail. More specifically, the cutter 51 has a cutter blade 89 directed toward the feed roller 50. A block 90 is mounted on the support body 49 and supports the spring 75. The presser 73 is pivotally mounted by a pin 91 on the support walls 52. A threaded rod 92 threadedly extends through the block 90 and has one end engaging an upper end of the presser 73. By turning the threaded rod 92 about its own axis, the threaded rod 92 is axially moved to adjust the distance between the distal end of the presser 73 and the outer peripheral surface of the feed roller 50.

The supports 62 are mounted on a movable base 95 movably mounted on the upper plate 58, the movable base 95 being movable along a key 96 embedded in the upper plate 58. The movable base 95 and the upper plate 58 are adjustably coupled by a threaded rod 97. By turning the threaded rod 97 about its own axis, the movable base 95 is moved along the key 96 to move the cutter blade 89 toward and away from the feed roller 50.

As shown in FIGS. 14A through 14C, the feed roller 50 has on its outer periphery a number of flat surfaces 50a and roughened surfaces 50b arranged alternately circumferentially at a pitch equal to the length of pieces to which the runner a is to be chopped. The flat surfaces 50a serve to bear the runner a thereon, while the roughened surfaces 50b serve to feed the runner a. The roughened surfaces 50b may comprise knurled surfaces or grooved surfaces. However, the feed roller 50 may have a smooth outer peripheral surface as shown in FIGS. 4 and 6 provided it has a suitable degree of hardness for bearing the runner a thereon and also has a suitable degree of surface friction. One example of material of such feed roller 50 is hard rubber.

The feed roller 50 and the cutter 51 are phased such that the runner a is fed by one of the roughened surface 50b on the feed roller 50 as it is turned, as shown in FIGS. 14A and 14B, and then the runner a is cut off by the cutter blade 89 which is advanced toward an adjacent one of the flat surfaces 50a on the feed roller 50 which is held at rest, as shown in FIG. 14C.

FIGS. 15A and 15B illustrate a modification in which a presser 73a is supported on a threaded end of a threaded rod 92a disposed in the block 90. The presser 73a can be moved toward and away from the feed roller 50 by turning the threaded rod 92a in the block 90.

Figure 16:
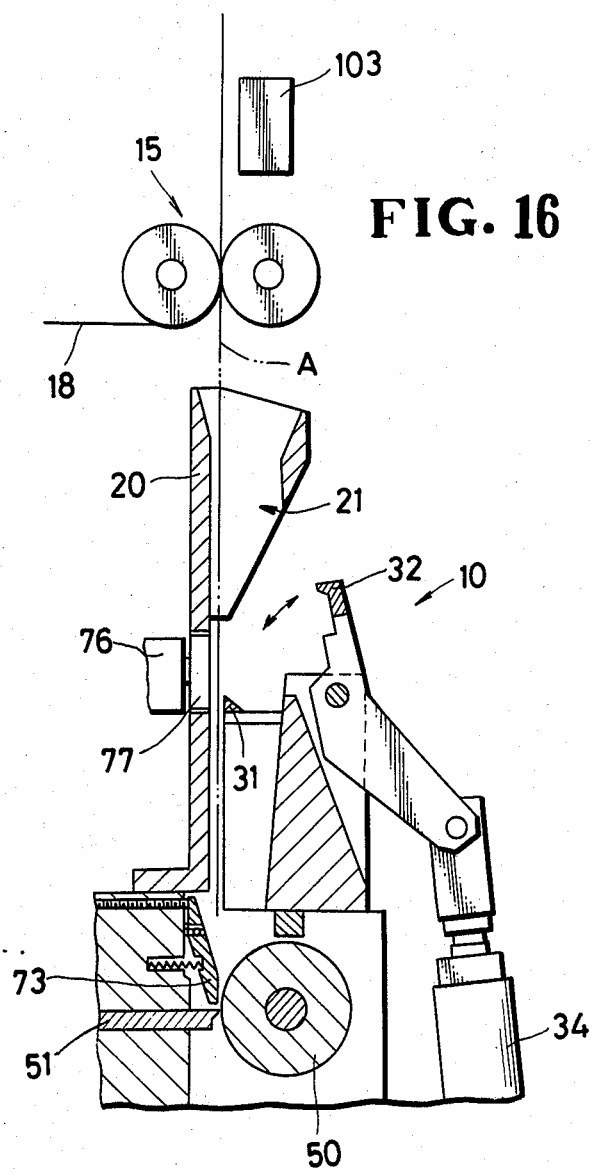
FIG. 16 is a schematic front elevational view of a chopping apparatus.
Figure 17:
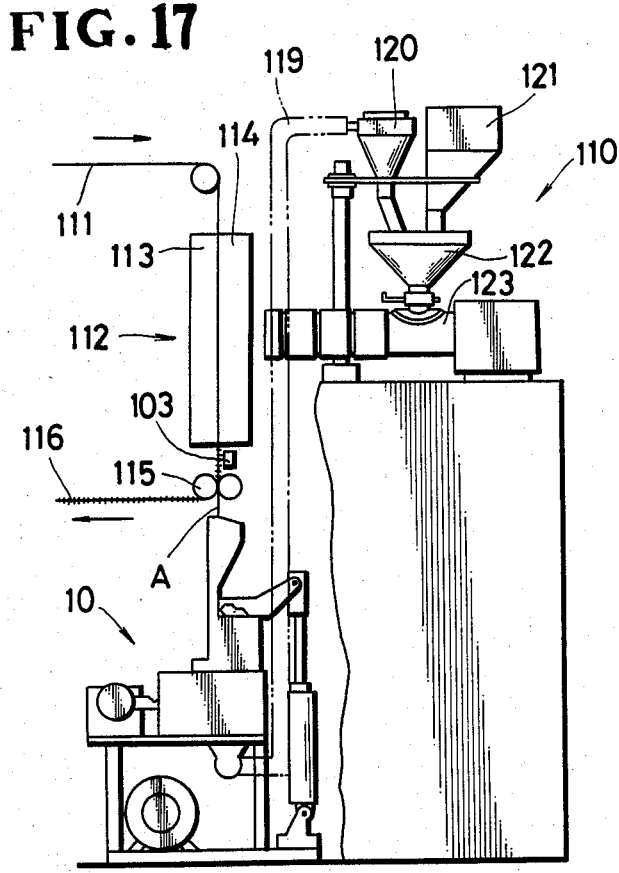
FIG. 17 is an apparatus for manufacturing slide fastener chains, incorporating the chopping apparatus of FIG. 16 therein.

FIGS. 16 and 17 show an injection molding machine 110 for injection-molding coupling elements on slide fastener tapes, the injection molding machine 110 being combined with the chopping apparatus 10 which is of substantially the same construction as described above.

Figure 18:
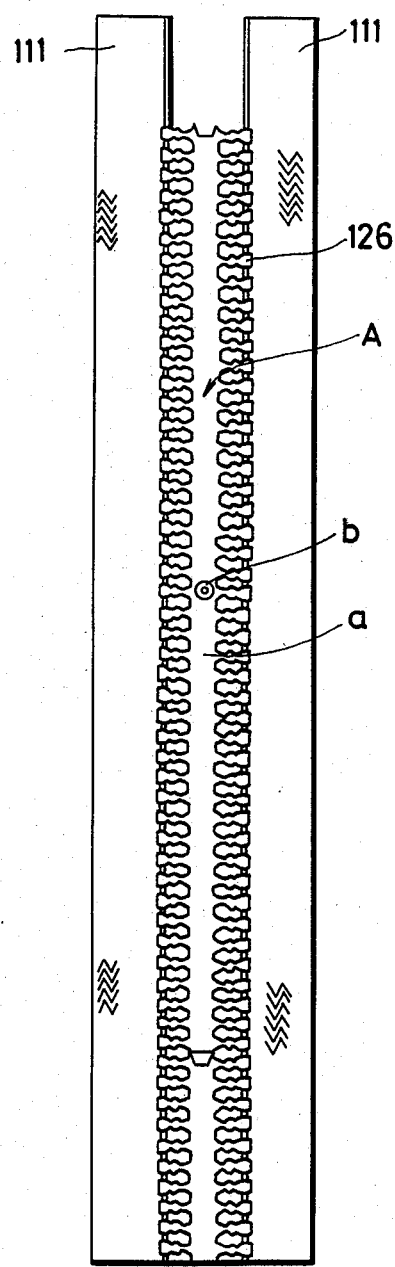
FIG. 18 is a plan view of a slide fastener chain produced by the apparatus of FIG. 17.
Figure 19:
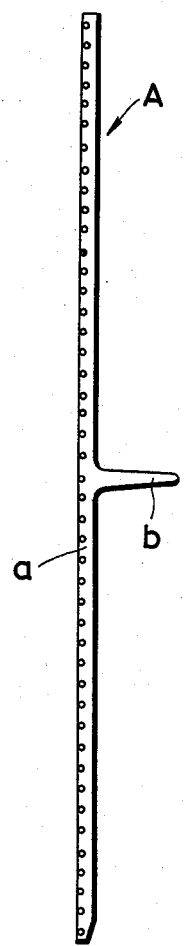
FIG. 19 is side elevational view of a runner with a sprue as removed from the slide fastener chain shown in FIG. 18.

As shown in FIG. 17, the injection molding machine 110 includes a mold assembly 112 composed of a movable mold 113 and a fixed mold 114 for injection-molding coupling elements on slide fastener tapes 111 supplied between the molds 113, 114. The injection molding machine 110 also includes a supply hopper 121 for supplying new chips and a transfer cyclone 120 for supplying recycled chips. The new and recycled chips are fed from the supply hopper 121 and the transfer cyclone 120 into a mixing hopper 122, from which the chips are fed into a heating cylinder 123. The chips are then melted in the heating cylinder 123 and the melted synthetic resin material is injected into the mold assembly 112 to injection-mold coupling elements 126 (FIG. 18) on the slide fastener tapes 111. Then, the movable mold 113 is moved away from the fixed mold 114, and a formed slide fastener stringer chain 116 is discharged from the mold assembly 112, and a runner structure A (FIG. 19) is separated from the stringer chain 116 by a separation roller pair 115. The runner structure A is then cut off and chopped by the chopping apparatus 10. Chopped chips discharged from the chopping apparatus 10 are delivered through a feed passage 119 into the transfer cyclone 120.

The chopping apparatus 10 additionally includes a photoelectric tube 103 disposed between the separation roller pair 115 and the mold assembly 112 for detecting a sprue b as is passes by. A signal from the photoelectric tube 103 is used for actuating the air cylinder 34.

Figure 20:
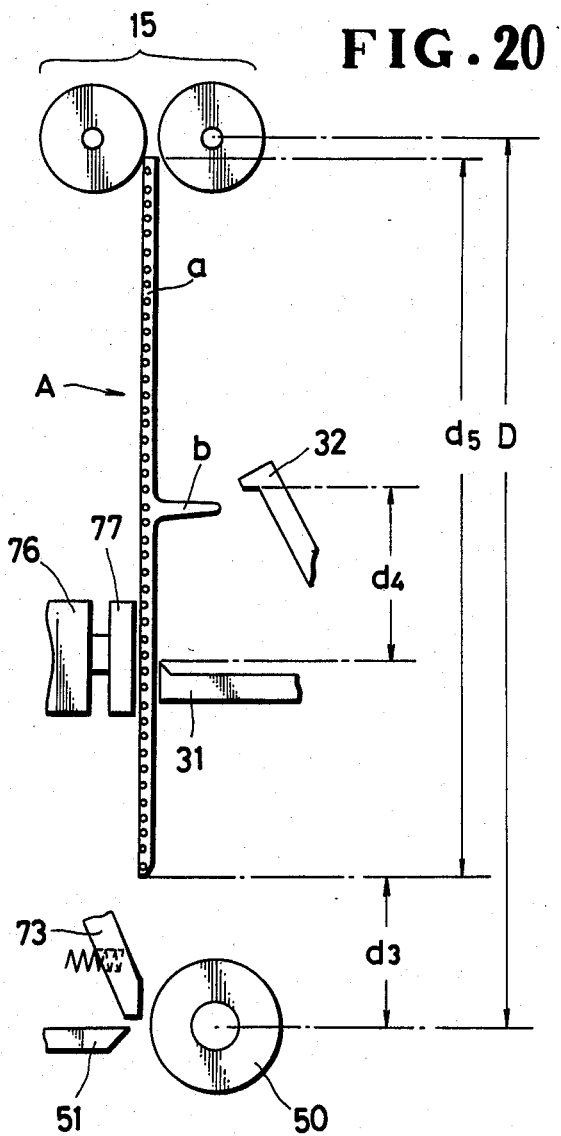
FIG. 20 is a schematic front elevational view showing the positional relationship of a separation roller pair, a sprue cutter, a feed roller, and a runner in the chopping apparatus of FIG. 16.

As shown in FIG. 20, the first cutter mechanism is arranged such that when the trailing end of the runner structure A leaves the roller pair 15, the sprue b is vertically positioned between the upper cutter 32 and the lower cutter 31. The vertical distance $d_3$ between the leading end of the runner structure A and the center of the feed roller 50 is substantially equal to the vertical distance $d_4$ between the cutter edge of the upper cutter 32 and the cutter edge of the lower cutter 31, the distance $d_3$ being preferably in the range of from 20 mm to 40 mm. The distance D between the center of the roller pair 15 and the center of the feed roller 50 is substantially equal to the length $d_5$ of the runner structure A plus the distance $d_4$. The sprue b may be depressed the distance $d_4$ by the upper cutter 32 for positive downward delivery which is more reliable than gravity feed.

Figure 21:
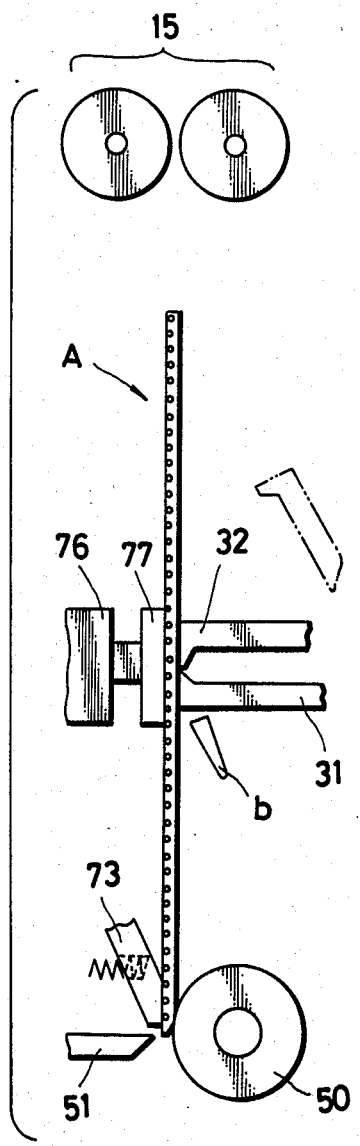
FIG. 21 is a view similar to FIG. 20, showing the condition in which a sprue has been severed off the runner.

FIG. 21 shows the position of the parts in which the sprue b has just been severed from the runner a by the upper and lower cutters 32, 31.

With the arrangement of FIG. 20, the runner structure A is not engaged simultaneously by the roller pair 15 and the feed roller 50. Where the sprue b is lowered by the upper cutter 32, the leading end of the runner a can reliably be fed into engagement with the feed roller 50. Therefore, the runner a can smoothly and quickly be fed toward the feed roller 50.

Figure 22:
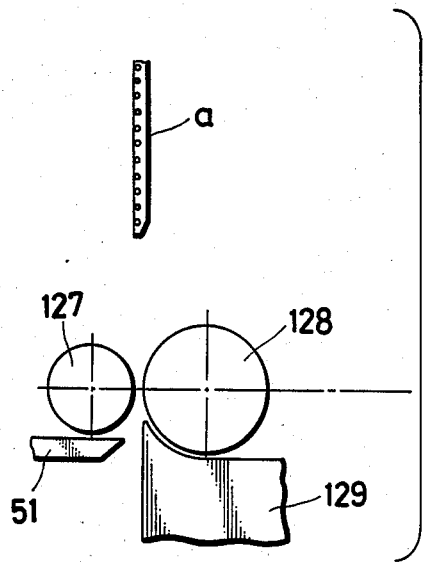
FIG. 22 is a schematic side elevational view of a feed roller according to another modification.

According to a modification shown in FIG. 22, a bearing base 129 is disposed below a feed roller 128, and a roller 127 coacts with the feed roller 128 for feeding the runner a. The cutter 51 is movable toward the bearing base 129 to chop the runner a on the bearing base 129.

Although various minor modifications may be suggested by those versed in the art, it should be understood that we wish to embody within the scope of the patent warranted hereon, all such embodiments as reasonably and properly come within the scope of our contribution to the art.

What is claimed is:

1. A method of chopping a runner structure composed of a runner and a sprue discharged from an injection molding machine, said method comprising the steps of:

(a) guiding the runner structure discharged from the injection molding machine;
    (b) cutting off the sprue from the runner of the runner structure as guided; and
    (c) chopping the runner and the cut-off sprue to chips.

2. A method according to claim 1, wherein said sprue is chopped after said runner has been chopped.

3. A method according to claim 2, wherein said sprue and said runner are chopped by a single cutter mechanism.

4. A method according to claim 1, including the step of delivering the chips into the injection molding machine for recycling.

5. An apparatus for chopping a runner structure composed of a runner and a sprue discharged from an injection molding machine, said apparatus comprising:

(a) a guide mechanism for guiding the runner structure discharged from the injection molding machine;
    (b) a first cutter mechanism for cutting off the sprue from the runner of the runner structure as guided by said guide mechanism; and
    (c) a second cutter mechanism for chopping the runner and the cut-off sprue into chips.

6. An apparatus according to claim 5, said guide mechanism having a cover mounted on a guide base plate and jointly providing a hopper-shaped runner receiver for passage therethrough of the runner structure.

7. An apparatus according to claim 6, said guide cover being composed of a pair of spaced side walls mounted on said guide base plate, and a front wall interconnecting said side walls remotely from said guide base plate, said front wall being inclined toward said guide base plate.

8. An apparatus according to claim 5, including a pusher mechanism for laterally displacing the runner structure to move said sprue toward said first cutter mechanism.

9. An apparatus according to claim 8, said guide mechanism including a guide base plate, said pusher mechanism comprising a plunger mounted on said guide base plate and a pusher actuated by said plunger to be displaced out of alignment with said guide base plate toward said first cutter mechanism.

10. An apparatus according to claim 5, said first cutter mechanism comprising a first cutter engageable with the sprue of the runner structure as guided by said guide mechanism and a second cutter actuatable into coaction with said first cutter to cut said spure off said runner.

11. An apparatus according to claim 10, said guide mechanism including a hopper-shaped sprue receiver disposed below and opening toward said first and second cutters.

12. An apparatus according to claim 5, said second cutter mechanism comprising a feed roller for intermittently feeding the runner and then the sprue from said first cutter mechanism, and a cutter reciprocably movable toward and away from said feed roller in timed relation thereto for chopping the runner and the sprue on said feed roller.

13. An apparatus according to claim 12, said second cutter mechanism including a presser for pressing the runner and the sprue against said feed roller.

14. An apparatus according to claim 13, said second cutter mechanism including a spring for normally urging said presser toward said feed roller.

15. An apparatus according to claim 13, said second cutter mechanism including a threaded member for positionally adjusting said presser with respect to said feed roller.

16. An apparatus according to claim 12, said feed roller having on an outer periphery thereof roughened surfaces for engaging and feeding said runner and said sprue, and smooth surfaces for bearing thereon the runner and the sprues as they are chopped by said cutter.

17. An apparatus according to claim 5, said guide mechanism having a guide base plate composed of first and second members interconnected by a hinge, said first member being angularly movable with respect to said second member.

18. An apparatus for manufacturing a slide fastener stringer chain composed of slide fastener stringer tapes and coupling elements molded thereon, said apparatus comprising:
(a) an injection molding machine including a separable mold assembly for injection-molding the coupling elements on the slide fastener stringer tape;
(b) at least one separation roller for separating a runner structure having a runner and a sprue from said slide fastener stringer chain;
(c) a guide mechanism for guiding the runner structure discharged from said roller;
(d) a first cutter mechanism for cutting off the sprue from the runner of the runner structure as guided by said guide mechanism; and
(e) a second cutter mechanism for chopping the runner and the cut-off sprue into chips.

19. An apparatus according to claim 18, said first cutter mechanism comprising a first cutter engageable with the sprue of the runner structure as guided by said guide mechanism and a second cutter actuatable into coaction with said first cutter to cut said sprue off the runner, said second cutter mechanism comprising a feed roller for intermittently feeding the runner and then the sprue from said first cutter mechanism, and a cutter reciprocably movable toward and away from said feed roller in timed relation thereto for chopping the runner and the sprue on said feed roller, the centers of said separation roller and said feed roller being spaced a distance which is substantially equal to the length of said runner structure plus the distance between the center of said feed roller and the leading end of the runner structure as its trailing end leaves said separation roller.

* * * * *